US010167233B2

(12) United States Patent
San-Miguel et al.

(10) Patent No.: US 10,167,233 B2
(45) Date of Patent: Jan. 1, 2019

(54) PRODUCT HAVING A HIGH ALUMINA CONTENT

(71) Applicant: SAINT-GOBAIN CENTRE DE RECHERCHES ET D'ETUDES EUROPEEN, Courbevoie (FR)

(72) Inventors: Laurie San-Miguel, Althen-des-Paluds (FR); Fabiano Rodrigues, Roussillon (FR); Christian His, Cavaillon (FR); Thibault Champion, Maubec (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 437 days.

(21) Appl. No.: 14/907,918

(22) PCT Filed: Jul. 18, 2014

(86) PCT No.: PCT/IB2014/063227
§ 371 (c)(1),
(2) Date: Jan. 27, 2016

(87) PCT Pub. No.: WO2015/011623
PCT Pub. Date: Jan. 29, 2015

(65) Prior Publication Data
US 2016/0185666 A1 Jun. 30, 2016

(30) Foreign Application Priority Data
Jul. 26, 2013 (FR) ...................................... 13 57374

(51) Int. Cl.
| | | |
|---|---|---|
| *C04B 35/101* | (2006.01) | |
| *B01J 19/02* | (2006.01) | |
| *C04B 35/10* | (2006.01) | |
| *C01B 3/02* | (2006.01) | |
| *C04B 35/106* | (2006.01) | |
| *C04B 35/185* | (2006.01) | |
| *C04B 35/443* | (2006.01) | |
| *C04B 35/482* | (2006.01) | |
| *C04B 35/66* | (2006.01) | |
| *F23M 5/00* | (2006.01) | |
| *F23R 3/00* | (2006.01) | |
| *C04B 38/06* | (2006.01) | |

(52) U.S. Cl.
CPC .............. *C04B 35/10* (2013.01); *B01J 19/02* (2013.01); *C01B 3/025* (2013.01); *C04B 35/106* (2013.01); *C04B 35/1015* (2013.01); *C04B 35/185* (2013.01); *C04B 35/443* (2013.01); *C04B 35/482* (2013.01); *C04B 35/66* (2013.01); *C04B 38/06* (2013.01); *F23M 5/00* (2013.01); *F23R 3/002* (2013.01); *F23R 3/007* (2013.01); *B01J 2219/0218* (2013.01); *B01J 2219/0263* (2013.01); *C04B 2235/3201* (2013.01); *C04B 2235/3208* (2013.01); *C04B 2235/3217* (2013.01); *C04B 2235/3218* (2013.01); *C04B 2235/3222* (2013.01); *C04B 2235/3232* (2013.01); *C04B 2235/3244* (2013.01); *C04B 2235/3272* (2013.01); *C04B 2235/3418* (2013.01); *C04B 2235/3463* (2013.01); *C04B 2235/5427* (2013.01); *C04B 2235/5436* (2013.01); *C04B 2235/5445* (2013.01); *C04B 2235/5472* (2013.01); *C04B 2235/608* (2013.01); *C04B 2235/72* (2013.01); *C04B 2235/77* (2013.01); *C04B 2235/96* (2013.01); *C04B 2235/9692* (2013.01); *F23M 2900/05004* (2013.01)

(58) Field of Classification Search
CPC ... C04B 35/043; C04B 35/0473; C04B 35/18; C04B 35/185
See application file for complete search history.

(56) References Cited

U.S. PATENT DOCUMENTS

| | | | |
|---|---|---|---|
| 3,226,241 | A | 12/1965 | Miller, Jr. |
| 3,449,084 | A | 6/1969 | Smoot et al. |
| 5,403,794 | A | 4/1995 | Morris et al. |
(Continued)

FOREIGN PATENT DOCUMENTS

| | | | | |
|---|---|---|---|---|
| EP | 1428807 A2 | 6/2004 | | |
| FR | 2914300 A1 * | 10/2008 | ........... | C04B 35/101 |
(Continued)

OTHER PUBLICATIONS

Oct. 21, 2014 International Search Report issued in International Patent Application No. PCT/IB2014/063227.
Buchel et al; "Bonite—a new raw material alternative for refractory innovations;" Proceedings of the Unified International Technical Conference on Refractories; 2005; pp. 462-467.
"High alumina refractories;" Harbison-Walker Handbook of Refractory Practice; 2005; pp. CR-7-CR-8.

*Primary Examiner* — Karl E Group
(74) *Attorney, Agent, or Firm* — Oliff PLC

(57) ABSTRACT

A sintered refractory product having the form of a block and consisting of a granulate formed by all the grains having a size larger than 100 µm, referred to as "coarse grains", and a matrix binding the coarse grains and consisting of the grains having a size smaller than or equal to 100 µm, the granulate representing between 45% and 90% by mass of the product, the product having a composition such that, in a mass percentage based on the oxides: $Al_2O_3 > 80\%$, $SiO_2 < 15\%$, $Na_2O < 0.15\%$, $Fe_2O_3 < 0.05\%$, $CaO < 0.1\%$, the other oxides forming the remainder up to 100%, and the $Na_2O$ content in the matrix being greater than 0.010%, in a mass percentage based on the mass of the product.

15 Claims, No Drawings

(56) References Cited

U.S. PATENT DOCUMENTS

| | | | | |
|---|---|---|---|---|
| 9,040,442 B2* | 5/2015 | Xiong | ............... | C04B 35/101 |
| | | | | 501/128 |
| 9,908,816 B2* | 3/2018 | Champion | ............ | C04B 35/482 |
| 2007/0203013 A1 | 8/2007 | Harmuth | | |
| 2013/0090230 A1 | 4/2013 | Champion et al. | | |
| 2014/0024520 A1* | 1/2014 | Xiong | ............... | C04B 35/101 |
| | | | | 501/128 |

FOREIGN PATENT DOCUMENTS

| | | |
|---|---|---|
| WO | 2005/085155 A1 | 9/2005 |
| WO | 2011/135517 A1 | 11/2011 |

\* cited by examiner

PRODUCT HAVING A HIGH ALUMINA CONTENT

TECHNICAL FIELD

The invention relates to a refractory product with a high alumina content comprising an aggregate bonded by a matrix comprising alumina.

The invention also relates to a device, and in particular to a gas turbine, comprising a refractory lining made of a product according to the invention.

TECHNOLOGICAL BACKGROUND

Alumina may come in several forms, depending on its manufacturing process.

The melting of bauxite makes it possible to obtain alumina known as "brown corundum". Brown corundum typically comprises an iron oxide content of the order of 0.2% to 1% for the purest products.

Alternatively, following the Bayer process, bauxite may be treated with soda, then calcined in order to carry out a purification. However, soda still remains, typically at contents of the order of 0.1% to 0.3% $Na_2O$. The alumina obtained is conventionally known as "calcined alumina".

Calcined alumina may be ground until a median size typically of around 0.5 to 50 microns, or even 0.3 to 10 microns, is obtained. The alumina obtained, referred to as "reactive alumina", is conventionally used for manufacturing technical ceramics. The sintering of calcined alumina particles makes it possible to manufacture coarse or fine particles, generally having the shape of platelets. The alumina thus obtained is known as "tabular alumina". Reactive alumina comprises, like tabular alumina and calcined alumina, a relatively large amount of soda.

Calcined alumina may also be fused in order to manufacture alumina known as "white corundum", which also comprises a large amount of soda, typically of around 0.2% to 0.4%.

Beyond these conventional aluminas, manufacturers such as Aluchem Inc. supply very pure alumina powders, comprising less than 0.1% soda. These aluminas are typically used for catalytic applications or the manufacture of single crystals. Sintered refractory products with a high alumina content that comprise an aggregate of mullite and/or of tabular alumina bonded by an aluminous matrix are known.

This type of refractory product may in particular form all or part of the inner lining of the combustion chamber of a gas turbine. The lining then typically has between 10% and 50% by weight of mullite, 50% to 90% of alumina and less than 5% of silica. The lining is subjected to very high thermomechanical stresses and also to a significant corrosion by the combustion gases, and in particular by high-temperature steam. This results in particular in a decomposition of the mullite and an attack of the silicate-based glassy phase.

U.S. Pat. No. 3,067,050 describes a refractory material produced from a mixture of 72% to 90% of alumina and less than 10% of amorphous silica, fired at around 1500° C.

US 2009/0181257 describes a material intended for a combustion chamber of a gas turbine.

One objective of the present invention is to provide a product with a high alumina content that has an improved thermomechanical resistance, and in particular an improved flexural strength at high temperature, and a high resistance to corrosion, especially by steam and the gases present in a gas turbine.

SUMMARY OF THE INVENTION

According to the invention, this objective is achieved by means of a sintered refractory product having the shape of a block and consisting of an aggregate formed by all the grains having a size of greater than 100 μm, referred to as "coarse grains", and a matrix bonding said coarse grains and consisting of grains having a size of less than or equal to 100 μm, the aggregate representing between 45% and 90% by weight of the product, said product having a composition such that, as a weight percentage on the basis of the oxides:
$Al_2O_3 > 80\%$,
$SiO_2 < 15\%$,
$Na_2O < 0.15\%$
$Fe_2O_3 < 0.05\%$,
$CaO < 0.1\%$,
the other oxides, i.e. the oxides other than $Al_2O_3$, $SiO_2$, $Na_2O$, $K_2O$, $Fe_2O_3$, and $CaO$, constituting the balance to 100%,
the content of $Na_2O$ in the matrix being greater than 0.010%, as a weight percentage on the basis of the weight of the product.

The inventors have discovered that, remarkably, a product according to the invention has a very high flexural modulus of rupture (MOR) at 1400° C. with no reduction in the corrosion resistance performance. More specifically, the gain in MOR at this temperature is around 25% relative to that measured on products with an equivalent alumina content but that have an $Na_2O$ content of greater than 0.15%. This unexplained discovery is all the more surprising since at temperatures below 1200° C. this difference is imperceptible.

The inventors have also discovered that it was advantageous for the matrix to comprise $Na_2O$ in a content of greater than 0.010%, as a weight percentage on the basis of the weight of the product, in order to obtain a high enough flexural modulus of rupture.

A product according to the invention may also have one or more of the following optional features:
the composition is such that $Na_2O + K_2O < 0.20\%$;
the composition is such that:
  $Al_2O_3 > 85\%$ and/or
  $3\% < SiO_2 < 10\%$ and/or
  $Na_2O + K_2O < 0.15\%$ and/or
  $Fe_2O_3 < 0.03\%$ and/or
  $CaO < 0.05\%$ and/or
  $ZrO_2 < 5\%$ and/or
  $TiO_2 < 5\%$;
the composition is such that:
  $Al_2O_3 > 90\%$ and/or
  $SiO_2 > 7\%$ and/or
  $Na_2O < 0.12\%$ and/or
  $ZrO_2 < 1\%$ and/or
  $TiO_2 < 1\%$;
the content of $Na_2O$ in the alumina aggregate is less than 0.070%, as a weight percentage on the basis of the weight of the aggregate;
the total amount of alumina on the one hand and of mullite and/or spinel and/or mullite-zirconia on the other hand is greater than 95%, as a weight percentage on the basis of the weight of the crystalline phases;
the amount of mullite is greater than 10% and less than 50%, as a weight percentage on the basis of the weight of the crystalline phases;
the open porosity is greater than 10% and less than 30%, preferably less than 25%, less than 20% by volume; less than 19% by volume;

the pore size distribution, measured using a mercury porosimeter, is such that:

$P_{50}$ is greater than 1 μm and less than 20 μm, and/or
$P_{80}$ is greater than 10 μm and less than 50 μm, and/or
$P_{90}$ is greater than 30 μm and less than 70 μm;

the aggregate consists, for more than 90% by weight, of coarse mullite grains and/or of coarse alumina grains and/or of coarse spinel grains and/or of coarse mullite-zirconia grains;

the matrix consists, for more than 90% by weight, of alumina;

the grains having a size less than or equal to 100 μm and greater than 10 μm represent more than 10% and less than 30% of the weight of the product and/or the grains having a size less than or equal to 10 μm represent more than 10% and less than 30% of the weight of the product.

The invention also relates to a process for manufacturing a refractory product according to the invention in the form of a sintered block, in particular a refractory tile, said manufacturing process comprising the following successive steps:

a) preparation of a feedstock suitable for the manufacture of a product according to the invention;
b) casting said feedstock in a mold and compacting said feedstock so as to form a preform;
c) removing the preform from the mold;
d) drying said preform;
e) sintering said preform.

The invention also relates to a device selected from the group formed by a gas turbine, a chemical reactor, especially a secondary reform reactor, in particular for the manufacture of ammonia or methane, firing supports, especially supports for firing ceramics, and glass furnace superstructures, said device comprising one wall at least partly formed by a product according to the invention.

Definitions

"Block" is understood to mean a solid object which is not a particle. It may in particular be a brick and more particularly a refractory plate or tile.

"Particle" is understood to mean a solid object having a size of less than 10 mm.

A distinction is made in particular between the particles having a size of greater than 100 μm, known as "coarse particles", those having a size of less than or equal to 100 μm and greater than 10 μm, known as "fine particles", and those having a size of less than or equal to 10 μm, known as "ultrafine particles". All of the coarse particles constitute the "coarse fraction". All of the fine particles constitute the "fine fraction". All of the ultrafine particles constitute the "ultrafine fraction". The fine and ultrafine particles are collectively known as "matrix particles" and constitute the "matrix fraction".

During the manufacture of a sintered product, the particles are bonded to one another. The "grains" correspond substantially, in the sintered product, to the particles in the feedstock. The size of the grains and their size distribution in the product may be evaluated by the particle size and distribution of the powders of particles in the feedstock, measured for example using a laser particle size analyzer.

A group of particles forms a "powder".

The particle size of a powder is evaluated conventionally by a particle size distribution characterization carried out with a laser particle size analyzer. The laser particle size analyzer may be, for example, a Partica LA-950 from HORIBA.

The percentiles or "centiles" 10 ($A_{10}$), 50 ($A_{50}$), 90 ($A_{90}$) and 99.5 ($A_{99.5}$), and more generally "n" $A_n$, of a property A of a population, for example of a population of particles or pores, are the values of this property corresponding to the percentages of 10%, 50%, 90%, 99.5% and n %, respectively, on the cumulative distribution curve relating to this property, the values relating to this property being classified in increasing order.

In particular, the percentiles $D_n$, and $P_n$, relate to particle sizes and to pore sizes, respectively.

Depending on the property considered, the percentages may be by weight, for example for the percentiles $D_n$, or by volume, for example for the percentiles $P_n$. The percentile 50 is conventionally known as the "median" percentile. For example, the percentile $D_{50}$ is conventionally known as the "median size" of the particles.

For example, 10%, by weight, of the particles of the powder have a size of less than $D_{10}$ and 90% of the particles by weight have a size of greater than or equal to $D_{10}$. The percentiles relating to the size of the particles may be determined with the aid of a particle size distribution produced using a laser particle size analyzer. Similarly, for example, 10% by volume of the pores of a product have a size of less than $P_{10}$ and 90% of the pores by volume have a size of greater than or equal to $P_{10}$. These percentiles may be determined according to the standard ISO 15901-1.2005 part 1, with the aid of a distribution produced by mercury porosimetry, for example by means of a Micromeritics AutoPore IV 9500 Series mercury porosimeter.

The particle size distribution of a particulate mixture of oxides of a feedstock makes it possible to evaluate the dimensions of the grains in the corresponding sintered product.

"Sintering" refers to the consolidation, by heat treatment at more than 1100° C., of a preform, optionally with a partial or complete melting of some of its constituents (but not of all its constituents, so that the preform is not converted to a liquid mass).

"Refractory" is understood to mean "having a melting point or dissociation point above 1000° C.".

"Impurities" is understood to mean the unavoidable constituents, unintentionally and necessarily introduced with the raw materials or resulting from reactions with these constituents. The impurities are not necessary constituents but only tolerated constituents.

Unless otherwise indicated, all the percentages relating to contents are weight percentages on the basis of the oxides.

"$Na_2O+K_2O$" means the sum of the contents of $Na_2O$ and of $K_2O$, each of these two oxides being optional.

The weight content of a constituent is conventionally expressed in the form of the most stable oxide. The devices conventionally used for determining the compositions (microprobe, X-ray fluorescence, ICP (inductively coupled plasma) spectroscopy) automatically convert the contents of the non-oxide constituents into equivalent oxide contents.

When reference is made to $ZrO_2$ or to ($ZrO_2+HfO_2$), it should be understood as $ZrO_2$ and traces of $HfO_2$. This is because a small amount of $HfO_2$, chemically inseparable from $ZrO_2$ and having similar properties, is always naturally present in sources of $ZrO_2$ at contents generally of less than 3%, as a weight percentage on the basis of $ZrO_2+HfO_2$. Hafnium oxide is not considered to be an impurity.

For the sake of clarity, the chemical formulae of the oxides are used to exclusively denote the contents of these oxides in the composition. For example "$ZrO_2$", "$HfO_2$", "$SiO_2$" or "$Al_2O_3$" denote the contents of these oxides in the composition and "zirconia", "hafnia", "silica" and "alumina" are exclusively used to denote crystalline phases of these oxides consisting of $ZrO_2$, $HfO_2$, $SiO_2$ and $Al_2O_3$, respectively. These oxides may however also be present in other phases, in particular in the form of mullite.

"Free" silica conventionally denotes an $SiO_2$ phase, the molecules of which are not associated with other molecules, for example in the form of refractory silicate, especially zircon or mullite.

"Containing a", "comprising a" or "having a" are understood to mean "having at least one", unless otherwise indicated.

DETAILED DESCRIPTION

Product

The product may in particular be in the form of a block, and in particular in the form of a plate or a tile. Preferably, the thickness of the block is less than 60 mm, less than 50 mm, less than 40 mm, or even less than 30 mm and/or greater than 10 mm, preferably greater than 15 mm. Preferably, the length and/or the width of the block is greater than 10 cm, greater than 20 cm and/or less than 50 cm, preferably less than 40 cm.

The block may also be in the form of a brick, and in particular a substantially parallelepipedal brick. The length of the brick may be greater than 15 cm, or even greater than 20 cm and/or less than 35 cm, less than 30 cm, or even less than 25 cm. The width and/or the thickness of the brick is preferably greater than 4 cm, greater than 5 and/or less than 10 cm, or even less than 8 cm.

Composition

Preferably, the oxides represent more than 90%, more than 95%, more than 99%, or even substantially 100% of the weight of the product.

$SiO_2$, $Na_2O$, $K_2O$, $Fe_2O_3$, and $CaO$ are optional oxides.

Preferably,
80%<$Al_2O_3$<95%,
2%<$SiO_2$<15%,
0.01%<$Fe_2O_3$<0.05%,
0.05%<$Na_2O+K_2O$<0.20%, with 0.03%<$Na_2O$<0.15%,
$CaO$<0.1%, the other oxides constituting the balance to 100%.

Preferably, $Al_2O_3$>85% and/or $SiO_2$<10% and/or $Na_2O+K_2O$<0.15% and/or $Fe_2O_3$<0.03% and/or $CaO$<0.05% and/or $Na_2O$<0.15% and/or $ZrO_2$<5% and/or $TiO_2$<5%.

Preferably, $SiO_2$>3% and/or $Na_2O$<0.12% and/or $ZrO_2$<1% and/or $TiO_2$<1%.

In one embodiment $Al_2O_3$>90%.

Preferably, $SiO_2$>3%, preferably $SiO_2$>5%, preferably $SiO_2$>7%.

Preferably, less than 20%, less than 10%, less than 5%, or even less than 1% of the silica is free, as a weight percentage on the basis of the silica. Preferably the non-free silica is present, for more than 90% by weight, or even substantially 100% by weight, in the form of a refractory alumina silicate, more particularly in the form of mullite.

Preferably, the other oxides are less reducible than $Al_2O_3$. They are preferably selected from $ZrO_2$, $TiO_2$, $MgO$, and rare earth elements such as $Y_2O_3$, $CeO_2$ and $HfO_2$.

Preferably, $MgO$<1%, preferably $MgO$<0.5%, preferably $MgO$<0.2%, preferably $MgO$<0.1%, preferably $MgO$<0.05%, preferably $MgO$<0.01%.

Preferably, $ZrO_2$<0.01%, or even $ZrO_2$<0.005%.

Preferably, $TiO_2$<0.01%, preferably $TiO_2$<0.004%.

Microstructure

A microprobe analysis of a product according to the invention shows that the matrix is less rich in sodium than a product having an overall $Na_2O$ content of greater than 0.15%. Without being able to explain it by a theory, it appears that the sodium diffuses during the firing or the sintering from the tabular alumina grains to the matrix, without interacting with the mullite.

Surprisingly, the inventors have however discovered that the presence of a minimum content of $Na_2O$ specifically in the matrix was advantageous for the flexural strength. Preferably, the total amount of alumina on the one hand and of mullite and/or spinel and/or mullite-zirconia on the other hand, preferably the total amount of alumina and of mullite, is greater than 95%, preferably greater than 99%, or even substantially 100%, on the basis of the total weight of the sintered refractory product.

Preferably, the amount of mullite is greater than 10%, greater than 20%, greater than 30% and/or less than 50%, less than 40%.

The presence of mullite is particularly advantageous for an application in a gas turbine. Preferably, the mullite is an electrocast mullite.

Preferably, the amount of alumina ($Al_2O_3$ phase) is greater than 50%, greater than 55%, greater than 60% and/or less than 80%, less than 70%.

The open porosity is preferably less than 20% by volume, and/or preferably greater than 10% by volume, or even greater than 15% by volume. The resistance to thermal shocks and to thermal cycling is thereby improved.

Advantageously, the pore size distribution, measured using a mercury porosimeter, is such that:

$P_{50}$ is greater than 1 µm, greater than 5 µm, greater than 10 µm, and/or less than 20 µm, less than 15 µm, preferably between 10 and 20 µm, and/or $P_{80}$ is greater than 10 µm, greater than 20 µm, greater than 25 µm, and/or less than 50 µm, less than 40 µm, or even less than 35 µm, and/or $P_{90}$ is greater than 30 µm, greater than 40 µm, greater than 45 µm, and/or less than 70 µm, less than 60 µm, or even less than 55 µm.

Aggregate

The presence of an amount of aggregate of greater than 45% advantageously improves the thermal shock resistance.

The aggregate represents preferably more than 50%, more than 55% and/or less than 85%, less than 80%, less than 70%, less than 60% of the weight of the product.

Composition

Preferably, the aggregate consists, for more than 90%, more than 95%, or even substantially 100% by weight, of coarse grains of mullite (72-80% $Al_2O_3$/20-28% $SiO_2$ approximately) and/or of coarse grains of virtually pure alumina (>99.5% $Al_2O_3$), in particular of tabular alumina, and/or of coarse grains of spinel and/or of coarse grains of mullite-zirconia.

Preferably, more than 80%, more than 90%, more than 95%, or even substantially 100% of the mullite and/or of the spinel ($MgAl_2O_4$) and/or of the mullite-zirconia (37% $ZrO_2$; 17% $SiO_2$; 46% $Al_2O_3$ as weight percentages) of the product is present in the aggregate.

The content of $Na_2O+K_2O$, preferably the content of $Na_2O$, in the aggregate is preferably less than 0.14%, preferably less than 0.12%, preferably less than or equal to 0.11%, or even less than 0.09%, as a weight percentage on the basis of the weight of the product.

The content of $Na_2O+K_2O$, preferably the content of $Na_2O$, in the aggregate, preferably the content in the alumina aggregate, in particular tabular alumina aggregate, is preferably less than 0.070%, preferably less than 0.050%, preferably less than 0.040%, preferably less than 0.030%, as a weight percentage on the basis of the weight of the aggregate. Advantageously, a very pure aggregate gives improved performances.

Preferably, more than 90%, more than 95%, or even substantially 100% by weight of the $SiO_2$ of the product is in the aggregate, preferably in coarse mullite grains. This implies in particular that little or no clay is used in the feedstock intended for the manufacture of the product according to the invention.

Particle Size Distribution

Preferably, the percentile $D_{90}$ of the aggregate is less than 5 mm, preferably less than 3 mm, preferably less than 2 mm, preferably less than 1 mm and/or greater than 0.2 mm, preferably greater than 0.3 mm, preferably greater than 0.4 mm.

The median size $D_{50}$ of the aggregate is preferably less than 2 mm, preferably less than 1 mm and/or greater than 0.2 mm, preferably greater than 0.3 mm.

Matrix

Composition

The matrix preferably consists, for more than 90%, more than 95%, or even substantially 100% by weight, of alumina, preferably of tabular and/or calcined alumina. Preferably, the matrix comprises substantially no silica.

The content of $Na_2O$ in the matrix is preferably greater than 0.015%, preferably greater than 0.020%, and/or preferably less than 0.14%, preferably less than 0.1%, preferably less than 0.09%, preferably less than 0.08%, as a weight percentage on the basis of the weight of the product. Such an $Na_2O$ content range makes it possible to obtain a product having satisfactory thermomechanical properties, under economic sintering conditions (atmospheric pressure, reduced temperature, typically at a temperature of less than 1700° C., or even less than or equal to 1650° C., in an oxidizing atmosphere, preferably in air, in a batch or continuous furnace).

Particle Size Distribution

The grains having a size of less than or equal to 100 μm and greater than 10 μm represent preferably more than 10%, more than 15% and/or less than 25%, less than 20% of the weight of the product.

The grains having a size of less than or equal to 10 μm represent preferably more than 10%, more than 15% or even more than 20% and/or less than 30%, less than 27% of the weight of the product.

Manufacturing Process

Steps a) to e) are steps conventionally used for manufacturing sintered products.

In step a), the feedstock contains a particulate mixture of oxides consisting of ultrafine particles, fine particles and coarse particles.

The way of determining the amounts of the oxides in the feedstock as a function of their contents in the product to be manufactured is fully known to a person skilled in the art. In particular, a person skilled in the art knows that the refractory oxides present in the feedstock are found in the sintered refractory product. For one and the same refractory product, the composition of the feedstock may however vary, especially as a function of the amounts and of the nature of the additives present in the feedstock.

Preferably, the feedstock comprises, as a percentage by weight on the basis of the oxides of the feedstock:
more than 10%, preferably more than 20% and/or less than 35%, less than 30%, or even less than 25% of calcined alumina and/or of reactive alumina, and/or
more than 30%, more than 35%, more than 40% and/or less than 55%, less than 50%, or even less than 45% of tabular alumina.

The presence of calcined and/or reactive alumina advantageously makes it possible to limit the sintering temperature.

The feedstock comprises preferably more than 1%, preferably more than 1.5%, as percentages by weight on the basis of the oxides, of tabular alumina particles having a size of less than 2 mm.

Preferably, the feedstock contains less than 1% by weight of MgO, on the basis of the oxides, more preferably contains no MgO, except in the form of impurities, at contents of less than 0.5%, preferably less than 0.2%. The process is thereby simplified.

Coarse Fraction

The coarse particles of tabular alumina, or even all of the coarse particles, have a weight content of $Na_2O+K_2O$, preferably of $Na_2O$, of less than 1500 ppm, preferably less than 1000 ppm and preferably less than 500 ppm, as percentages by weight on the basis of the oxides of the feedstock. Without being bound by this theory, the inventors consider that this low content prevents a reaction which would lead to a prejudicial phase.

The average weight content of $Fe_2O_3$ of the coarse particles is preferably less than 500 ppm, or even less than 300 ppm.

The coarse fraction preferably comprises, as percentages by weight on the basis of the oxides of the feedstock:
more than 10%, more than 15%, more than 20%, and/or less than 45%, less than 35%, less than 30%, or even less than 25% of alumina particles, preferably of tabular alumina particles, and/or
more than 1%, preferably more than 5%, more than 15%, more than 25%, more than 30% and/or less than 45%, less than 40% of mullite particles.

The coarse particles preferably have a size of less than 2 mm.

Fine Fraction

The fine fraction preferably comprises, as percentages by weight on the basis of the oxides of the feedstock, more than 1%, more than 5%, more than 10%, more than 15%, and/or less than 25%, less than 20% of tabular alumina particles, said particles preferably having a size of greater than 10 μm and less than 100 μm.

The ultrafine fraction preferably comprises, as percentages by weight on the basis of the oxides of the feedstock, more than 5%, preferably more than 10%, more than 15%, more than 20% and/or less than 30%, less than 25% of calcined or reactive alumina particles.

Preferably, all of the calcined alumina particles and/or reactive alumina particles have a median size $D_{50}$ of less than 10 μm, preferably less than 5 μm and/or greater than 1 micron, preferably greater than 2 μm.

Additives

The feedstock may also contain one or more additives, optionally in particulate form, conventionally used for giving the feedstock a sufficient plasticity during the shaping step b) and for imparting a sufficient mechanical strength to the preform. The amounts of additives are not limiting. In particular, the amounts conventionally used in the known sintering processes are suitable. The additives are however selected so that their compositions, and in particular their contents of alkali metals and alkaline-earth metals, are compatible with the manufacture of a refractory product in accordance with the invention.

Certain oxides may be introduced by the additives. As examples of additives that can be used, mention may be made, nonlimitingly, of:

- temporary (i.e. completely or partly eliminated during the drying and firing steps) organic binders, such as resins, derivatives of cellulose or of lignin, such as carboxymethyl cellulose and dextrin, and polyvinyl alcohols, etc. Preferably, the amount of temporary binder is between 0.1% and 6% by weight relative to the weight of the particulate mixture of oxides of the feedstock;
- chemical binders, such as phosphoric acid or aluminum monophosphate;
- hydraulic binders, such as aluminous cements, for instance the SECAR 71 cement, or cement of CaO aluminate type;
- deflocculants, such as alkali metal polyphosphates or methacrylate derivatives;
- sintering promoters such as titanium dioxide (in a proportion that does not exceed 2% approximately of the weight of the feedstock) or magnesium hydroxide;
- shaping agents, such as magnesium stearate or calcium stearate;
- additions of natural silico-aluminate type, for example clays, or of synthetic silico-aluminates. These additions, in particular the natural clays, may introduce alumina, silica and some alkali metal or alkaline-earth metal oxides, or even iron oxide.

In the feedstock, water is also conventionally added. The amount of water added, on the basis of the particulate mixture of the oxides, is preferably less than 5%, less than 4%, or even less than 3%.

The mixing of the various constituents of the feedstock is continued until a substantially homogeneous feedstock is obtained.

In step b), the feedstock is placed in a mold, then compacted, preferably by vibration and/or pressing and/or tamping, so as to form a preform.

In the case of shaping by pressing, a specific pressure of 400 to 800 kg/cm$^2$ is suitable for obtaining a non-plastic paste. The pressing is preferably carried out uniaxially or isostatically, for example by means of a hydraulic press. It may advantageously be preceded by a manual or pneumatic ramming operation and/or a vibrating operation.

In step d), the drying is preferably carried out in air or in a humidity-controlled atmosphere, preferably at a temperature between ambient temperature and 200° C. It preferably lasts until the residual moisture of the preform is less than 0.5%, conventionally between 10 hours and a week depending on the format of the preform.

In step e), the dried preform is fired so as to be sintered. The sintering operation is well known to a person skilled in the art. The sintering corresponds to the thermal consolidation of the material. It is generally accompanied by a reduction in the porosity and by a dimensional shrinkage.

The sintering temperature depends on the composition of the feedstock. A temperature between 1300° C. and 1800° C. is preferred. The sintering is preferably carried out in an oxidizing atmosphere, more preferably in air. It is preferably carried out at atmospheric pressure. The duration of the firing, preferably between 1 and 15 days approximately from cold to cold, varies as a function of the materials but also of the size and of the shape of the refractory products to be manufactured.

Step e) converts the preform into a refractory product according to the invention, particularly useful as a refractory tile of a combustion chamber of an industrial plant. Unlike products that are sintered in situ, that is to say sintered after having been placed in their service position, for example after having been sprayed onto a wall to be protected, a product according to the invention is preferably sintered in a kiln, so that each of its faces is substantially heated in the same manner, before it is placed in its service position. The temperature gradient is thus prevented from being dependent on the point under consideration on the outer surface of the block. Unlike products that are sintered in situ, the product according to the invention thus has a density and a microstructure that are homogeneous throughout the product, which makes it possible, in service, to limit the local thermomechanical stresses and the points of corrosion, erosion or recession, and therefore to increase the service life of the product.

Applications

The side wall of a gas turbine conventionally comprises a plurality of blocks, preferably in the form of tiles, which are assembled.

In order to form this side wall, a product according to the invention may be used directly or be assembled by means of appropriate expansion joints, according to techniques well known to a person skilled in the art.

Examples

The following examples are provided for illustrative purposes and do not limit the invention. They were manufactured according to steps a) to e) described above. More specifically, the raw materials were mixed in an Eirich-type mixer. The feedstock thus obtained was pressed uniaxially in order to obtain preforms with dimensions of 210×200×40 mm$^3$, the relative dry density of which was greater than 95%. The sintering was carried out at 1630° C. in air.

For examples 2 to 4, the aggregate consists of tabular alumina (T60/T64 grades supplied by Almatis, which have an Na$_2$O content of between 1800 and 3000 ppm, i.e. between 0.18% and 0.3% by weight) and electrocast mullite 10F supplied by Washington Mills. In example 1, the grades of tabular alumina aggregate supplied by Almatis were replaced by the corresponding C99LS grades supplied by Aluchem Inc. which have an Na$_2$O content of between 350 and 520 ppm, i.e. between 0.035% and 0.052% by weight.

Comparative example 3 differs from example 2 in that it comprises a matrix with a higher loading of Na$_2$O via the use of a sodium solution (soda) in the mixture before shaping.

Comparative example 4 differs from example 2 in that it comprises a source of very pure fine alumina (PFR40/P122B) supplied by RTA (Rio Tinto Alcan) containing in particular less Na$_2$O than the source of fine alumina from example 2 (A10/A15SG). Comparative example 5 differs from example 1 in that it has a very pure matrix due to the fact that it uses the same source of fine alumina as that used in comparative example 4.

For the examples, the aggregate represents 57% of the weight of the product, the balance to 100% consisting, by definition, of the matrix.

The following table indicates the raw materials, the characteristics of the products obtained and the results obtained.

TABLE 1

| | Examples | | | | |
|---|---|---|---|---|---|
| | 1 | 2* | 3* | 4* | 5* |
| Raw materials that introduce the oxides | | | | | |
| Mixture of tabular alumina particles: median size 350 μm; maximum size 1.5 mm from T60/64 grades supplied by Almatis | — | 42 | 42 | 42 | |
| Mixture of tabular alumina particles of median size 350 microns, maximum size 1.5 mm from C99LS grades supplied by Aluchem Inc. | 42 | — | — | — | 42 |
| Mixture of calcined alumina particles ($D_{50}$ = 3.5 microns) from A10/15SG grades supplied by Almatis | 23 | 23 | 23 | | |
| Mixture of calcined alumina particles ($D_{50}$ = 3.5 microns) from PFR40/P122B grades supplied by Rio Tinto Alcan | | | | 23 | 23 |
| Electrocast mullite 10 F grade from Washington Mills | 35 | 35 | 35 | 35 | 35 |
| Total mineral particles | 100 | 100 | 100 | 100 | 100 |
| Raw materials that introduce the oxides | | | | | |
| Organic and/or mineral binders | +1.5 | +1.5 | +1.5 | +1.5 | +1.5 |
| Sodium solution 1.5 g/liter | 0 | 0 | +2.6 | 0 | 0 |
| Water | +2.6 | +2.6 | | +2.6 | +2.6 |
| Chemical composition of the product | | | | | |
| $Al_2O_3$ + $SiO_2$ (%) | >99.8 | >99.7 | NM | >99.7 | >99.8 |
| $Na_2O$ (%) | 0.10 | 0.17 | 0.68 | 0.16 | 0.085 |
| $K_2O$ (%) | 0.004 | 0.004 | NM | 0.004 | 0.004 |
| $Fe_2O_3$ (%) | 0.016 | 0.023 | NM | 0.017 | 0.007 |
| CaO (%) | 0.03 | 0.03 | NM | <0.03 | 0.01 |
| MgO (%) | 0.008 | 0.008 | NM | 0.007 | 0.003 |
| $ZrO_2$ (%) | 0.006 | 0.004 | NM | 0.006 | 0.005 |
| Chemical composition of the matrix as a weight percentage of the product | | | | | |
| $Na_2O$ (%) | 0.02 | 0.03 | 0.54 | 0.02 | 0.009 |
| Product properties | | | | | |
| Wet green density (g/cm³) | 2.99 | 2.99 | 2.98 | 2.98 | 2.98 |
| Moisture (% water) | 2.5 | 2.5 | 2.5 | NM | 2.5 |
| Bulk density (g/cm³) | 2.93 | 2.92 | 2.96 | 2.90 | 2.87 |
| Open porosity (%) | 17.5 | 18.0 | 16.74 | 18.7 | 19.6 |
| $P_{50}$ pores (Hg porosimetry) - microns | 13.5 | 24.1 | NM | NM | NM |
| $P_{80}$ pores in microns (Hg porosimetry) - microns | 30 | 60 | NM | NM | NM |
| $P_{90}$ pores in microns (Hg porosimetry) - microns | 50 | 100 | NM | NM | NM |
| MOR measured at 20° C. (MPa) | 10.5 | 9.9 | 11.7 | 11.0 | 7.5 |
| MOR (MPa) measured at 20° C. after three thermal shocks at 1200° C. | 4.3 | 3.1 | 2.8 | 3.5 | 3.3 |
| MOR loss after three thermal shocks at 1200° C. (%) | −59 | −69 | −76 | −68 | −56 |
| MOR measured at 1200° C. (MPa) | 8.7 | 8.5 | 11.2 | NM | 6.2 |
| MOR measured at 1400° C. (MPa) | 8.0 | 6.5 | 4.5 | NM | 5.1 |
| Steam corrosion test MOR loss before/after corrosion (%) | −21 | −26 | NM | NM | NM |

*examples outside of the invention;
NM: not measured

The density and the open porosity are measured according to the ISO 5017 standard on a test specimen with dimensions of 20×20×80 mm³ taken from the core of the block.

The weight contents of oxide $Na_2O$, CaO, $K_2O$, MgO, $ZrO_2$, $Fe_2O_3$ and other minor oxides are measured by inductively coupled plasma (ICP) emission spectrometry, the $SiO_2$ content and the $Al_2O_3$ content are determined by X-ray fluorescence (XRF) spectroscopy.

The modulus of rupture at 20° C. (MOR 20° C.) is measured in air on a test specimen with dimensions of 80×20×20 mm³. The 3-point bending fixture is assembled with a distance of 60 mm between the two lower supports and the descent rate of the punch is equal to 0.5 mm/min. The value is an average resulting from three successive measurements.

The modulus of rupture at 1200° C. or at 1400° C. (MOR 1200° C. and MOR 1400° C.) is measured in air on a test specimen with dimensions of 80×20×20 mm³. The 3-point bending fixture is assembled with a distance of 70 mm between the two lower supports and the descent rate of the punch is equal to 0.5 mm/min. The value is an average resulting from three successive measurements.

The relative loss of flexural strength (MOR loss) was measured according to the standardized PRE III.26/PRE/R.1.78 test. This test makes it possible to determine the thermal shock behavior by the relative loss of flexural strength (MOR) after one or more cycles that consist in heating the test specimen from ambient temperature to a temperature of 1200° C., in keeping the test specimen at this temperature for 30 minutes, then in submerging the test specimen in a cold water quench tank. The MOR values before and after the thermal shocks are measured according to the protocol described above. The relative loss of flexural strength is the ratio of the difference between these MOR values to the MOR value before application of the thermal shocks.

The steam oxidation test makes it possible to internally evaluate the behavior of the products under gas turbine application conditions. The oxidation test is carried out at 1400° C. for 500 hours in steam with a constant throughput of 32 kg/m³/h. the corrosion resistance is obtained by measuring the relative loss of flexural strength between a sound sample and a sample that has undergone the oxidation test. Example 1 according to the invention has an MOR at 20° C. of greater than 10 MPa and provides the best results for the residual MOR after three thermal shocks and the MOR at 1400° C. while maintaining a good corrosion resistance. In this example, the content of $Na_2O$ in the aggregate is less than 0.09%, as a weight percentage on the basis of the weight of the product, and the content of $Na_2O$ in the tabular alumina aggregate is less than 0.05% as a weight percentage on the basis of the weight of the aggregate. The comparison of example 1 on the one hand and examples 2 and 3 on the other hand shows that it is preferable to reduce the $Na_2O$ content.

Example 4 with a matrix having a very low $Na_2O$ content has a residual MOR after three thermal shocks that is significantly lower than that of the product from example 1 according to the invention which has a purer aggregate. The comparison of examples 1 and 4 thus shows that it is preferable to purify the aggregate rather than the matrix.

Comparative example 5 has a matrix which comprises less than 0.010% of $Na_2O$, unlike example 1. This results in a higher open porosity and a lower MOR at 20° C. The MOR at 20° C. and the residual MOR after three thermal shocks are too low for the targeted applications.

As is now clearly apparent, the invention provides a product that is perfectly well suited to the targeted applications, and in particular to a gas turbine.

The invention is not however limited to this application.

The invention claimed is:

1. A sintered refractory product having the shape of a block and consisting of:
   grains having a size of greater than 100 µm, referred to as "coarse grains", the coarse grains forming an aggregate, and
   a matrix bonding said coarse grains and consisting of grains having a size of less than or equal to 100 µm,
the aggregate representing between 45% and 90% by weight of the product,
said product having a composition such that, as a weight percentage on the basis of the oxides:
   $Al_2O_3>80\%$,
   $SiO_2<15\%$,
   $Na_2O<0.15\%$
   $Fe_2O_3<0.05\%$,
   $CaO<0.1\%$,
   the other oxides constituting the balance to 100%,
the content of $Na_2O$ in the matrix being greater than 0.010%, as a weight percentage on the basis of the weight of the product, the product having crystalline phases.

2. The product as claimed claim 1, wherein:
$Na_2O+K_2O<0.20\%$.

3. The product as claimed in claim 1, wherein:
$Al_2O_3>85\%$ and/or
$3\%<SiO_2<10\%$ and/or
$Na_2O+K_2O<0.15\%$ and/or
$Fe_2O_3<0.03\%$ and/or
$CaO<0.05\%$ and/or
$ZrO_2<5\%$ and/or
$TiO_2<5\%$.

4. The product as claimed claim 1, wherein:
$Al_2O_3>90\%$ and/or
$SiO_2>7\%$ and/or
$Na_2O<0.12\%$ and/or
$ZrO_2<1\%$ and/or
$TiO_2<1\%$.

5. The product as claimed in claim 1, wherein the content of $Na_2O$ in the aggregate is less than 0.070%, as a weight percentage on the basis of the weight of the aggregate.

6. The product as claimed in claim 1, wherein a total amount of
   alumina and of
   mullite and/or spinel and/or mullite-zirconia is greater than 95%, as a weight percentage on the basis of the weight of the crystalline phases.

7. The product as claimed in claim 1, wherein the amount of mullite is greater than 10% and less than 50%, as a weight percentage on the basis of the weight of the crystalline phases.

8. The product as claimed in claim 1, having an open porosity of greater than 10% and less than 30% by volume.

9. The product as claimed in claim 1, having an open porosity of less than 20% by volume.

10. The product as claimed in claim 1, having a pore size distribution, measured using a mercury porosimeter, such that:
   $P_{50}$ is greater than 1 µm and less than 20 µm, and/or
   $P_{80}$ is greater than 10 µm and less than 50 µm, and/or
   $P_{90}$ is greater than 30 µm and less than 70 µm.

11. The product as claimed in claim 1, wherein more than 90% by weight of the aggregate consists of coarse mullite grains, coarse alumina grains, coarse spinel grains, coarse mullite-zirconia grains, or any combination thereof.

12. The product as claimed in claim 1, wherein more than 90% by weight of the matrix consists of alumina.

13. The product as claimed in claim 1, wherein the grains of the matrix having a size greater than 10 µm represent more than 10% and less than 30% of the weight of the product and/or the grains of the matrix having a size less than or equal to 10 µm represent more than 10% and less than 30% of the weight of the product.

14. A device selected from the group formed by a gas turbine, a chemical reactor, a firing support and a glass furnace superstructure, said device comprising one wall at least partly formed by a product according to claim 1.

15. The device as claimed in claim 14, said chemical reactor being a secondary reforming reactor for the manufacture of ammonia or methane, and the firing support being a firing support for ceramic parts.

* * * * *